United States Patent Office 3,148,152
Patented Sept. 8, 1964

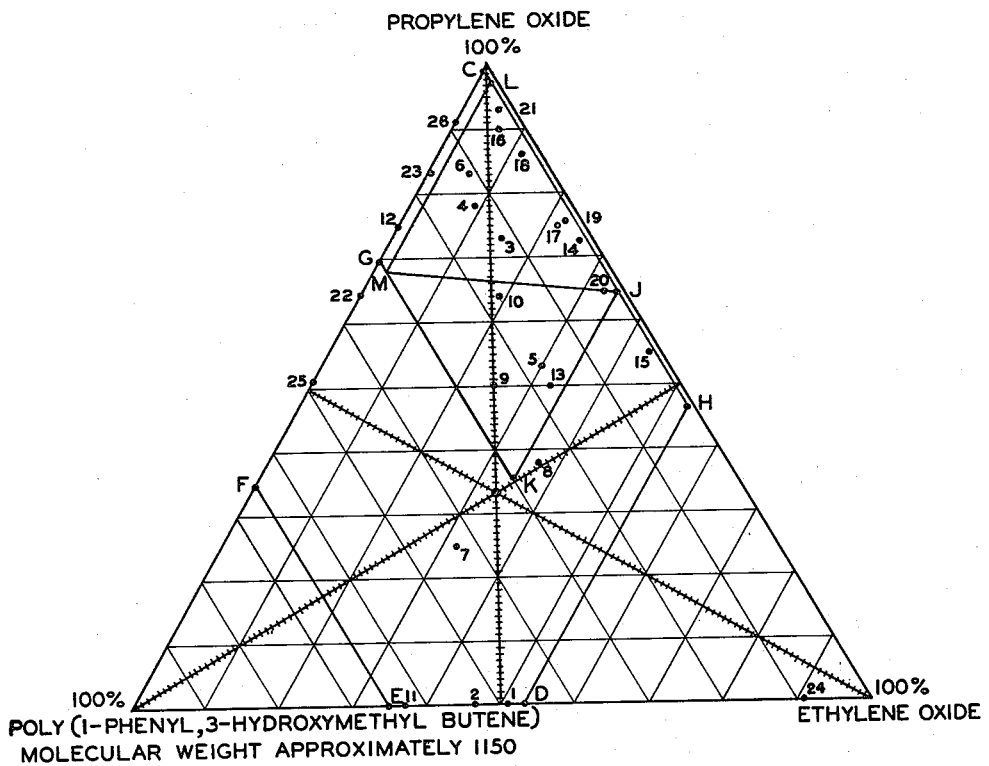

3,148,152
PROCESS FOR BREAKING PETROLEUM EMULSIONS AND OXYALKYLATED DERIVATIVES OF FUSIBLE RESINS
Melvin De Groote, University City, and Owen H. Pettingill, Kirkwood, Mo., assignors to Petrolite Corporation, Wilmington, Del., a corporation of Delaware
Filed Jan. 27, 1958, Ser. No. 711,314
10 Claims. (Cl. 252—331)

This invention relates to processes or procedures particularly adapted for preventing, breaking or resolving emulsions of the water-in-oil type, and particularly petroleum emulsions.

Our invention provides an economical and rapid process for resolving petroleum emulsions of the water-in-oil type that are commonly referred to as "cut oil," "roily oil," "emulsified oil," etc., and which comprises fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil, and relatively soft water on weak brines. Controlled emulsification and subsequent demulsification under the conditions just mentioned are of significant value in removing impurities, particularly inorganic salts, from pipeline oil.

Demulsification as contemplated in the present application includes the preventive step of co-mingling the demulsifier with the aqueous component which would or might subsequently become either phase of the emulsion in the absence of such precautionary measure. Similarly, such demulsifier may be mixed with the hydrocarbon component.

The resolution of emulsions and particularly oil field emulsions is well known. See, for example, U.S. Patent No. 2,552,528, dated May 15, 1951, to De Groote, with particular reference to column 23 thereof. See also "Treating Oil Field Emulsions," 2nd edition, published by the American Petroleum Institute.

Subsequent subject matter is divided into four parts:
Part 1 is concerned with a description of the invention;
Part 2 is concerned with suitable polybutenes which are used as the initial reactants;
Part 3 is concerned with the preparation of oxyalkylation derivatives of the polybutenes;
Part 4 is concerned with procedures for using the previously designated oxyalkylated derivatives for breaking petroleum emulsions.

PART 1

The present invention in one of its major aspects involves the oxyalkylation of a resinous polyol. The resinous polyol is one derived from a styrene or substituted styrene, particularly where there is a hydrocarbon radical having at least one and not over 10 carbon atoms in the molecule, and allyl alcohol or an equivalent procedure. The simplest compound illustrating this class is one that is available commercially in the open market as a hard resinous polyhydric alcohol exhibiting high primary hydroxyl functionality. The manufacturere of the product describes it as far as the non-terminal structural units go as

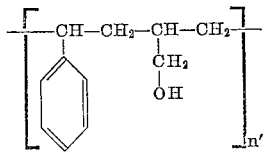

in which the average number of hydroxyl groups is slightly in excess of 5, and the average molecular weight is 1150. The average equivalent weight is 222 and the hydroxyl value is 0.45 equivalent of OH per 100 grams of polyol.

The above material has been manufactured primarily as a polyol for alkyd resin manufacture. When a substituted styrene is used, for instance, methylstyrene, ethylstyrene, dimethylstyrene, etc., the products obtained may not have and frequently do not have the high resinous character which makes the non-substituted styrene derivative particularly attractive for alkyd resin manufacture. However, for the purpose herein described it is immaterial whether the polyol is a hard resin, a soft resin, or is simply a highly viscous liquid at ordinary room temperature. For this reason isopropylstyrene, butylstyrene, amylstyrene, octylstyrene, nonylstyrene, and decylstyrene may be employed. Similarly, one need not have as many as 5 hydroxyl radicals per polyol but may have as few as 3 and as many as 10.

The molecular weights of the compound, especailly in the instance of the substituted products and also bearing in mind the lower number of hydroxyl units in a suitable polyol may range from 750 to 2250. The preferred range, however, is 1000 to 1500 and preference at this time is to use the previously described commercially available product. However, the substituted styrenes and especially those having an alkyl substituent having 4 to 9 carbon atoms in the substituent radical are particularly desirable.

In light of what has been said previously the invention is thus described in its broadest aspect by claim 1 hereto attached and in its present broad preferred aspect by claim 6 attached.

PART 2

In describing the invention reference has been made to products obtained by reaction between styrene or substituted styrene and allyl alcohol. There are other reactants which apparently yield somewhat similar compounds such as, for example, crotyl alcohol (2-buten-1-ol). 2-methyl-2-penten-4-ol yields somewhat similar products but in this instance the polymer has a secondary alcohol radical and not a terminal alcohol radical. In light of the chemical availability of the preferred product and what has been said in the description of the invention in Part 1, preceding, it is not believed any further description is required.

PART 3

The bulk of the literature on oxyalkylation deals with oxyethylation. The same procedures may be employed in oxypropylation, with such obvious modifications in operating procedures as may be necessary. As to oxyalkylation, see the brochure "Ethylene Oxide Technical Bulletin 1956," issued by Jefferson Chemical Company, Inc., New York, New York. Note also the extensive bibliography it contains.

As to the oxyalkylation of resinous materials, see U.S. Patent 2,499,365, dated March 7, 1950, to De Groote et al. The particular oxides therein employed are identical with those employed in the present process, to wit, ethylene oxide, propylene oxide, butylene oxide, glycide, and methylglycide. In regards to the butylene oxides the oxybutylation process is limited to a straight chain isomer or mixtures of straight chain isomers as differentiated from isobutylene oxide. At least one manufacturer supplies mixed straight chain butylene isomers substantially free from isobutylene oxide, or at least having less than 1% of isobutylene oxide in which 85% represents the 1–2 straight chain oxide, and 15% the 2–3 oxide.

Our preference in regard to oxides is the use of either propylene oxide or ethylene oxide alone or in combination. The reason is these two oxides are cheaper than the others and more reactive. In the appended claims the preferred sub-genera are concerned with derivatives obtained by propylene oxide alone, or ethylene oxide alone, or propylene oxide and ethylene oxide and particularly in procedures where all the propylene oxide is used first and then the ethylene oxide.

Our preference in regard to oxyalkylation involves using a solution of the initial reactants in xylene, or other suitable solvent, and using an alkaline catalyst such as finely divided caustic soda, caustic potash, sodium methylate, etc. The procedure used is that which has been described in brochures of manufactures of these oxides and in a large number of patents as, for example, U.S. Patent No. 2,574,543, dated November 13, 1951, to De Groote et al.

Subsequent examples illustrate oxyalkylation further.

In regard to hydrophile properties of the oxyalkylated derivatives reference is again made to aforementioned U.S. Patent 2,499,365 and particularly to the definitions employed as appear in columns 2 and 3 of the patent, and columns 91, 92, 93, 94, 95, 96 and 97 of the patent. The emulsification tests are best described in the text of the aforementioned patent although noting that in this instance the hydroxyl radical of the initial reactant is not a phenolic hydroxyl but an alcoholic hydroxyl. However, after the first addition of an ethylene oxide to a phenolic hydroxyl subsequent additions of course involve an alcohol hydroxyl and not a phenolic hydroxyl. For this reason the text without change is more than ample.

As to a further description of the oxyalkylation of resins see U.S. Patent No. 2,799,368 dated May 14, 1957 to De Groote et al., Parts 1 and 2.

It has been pointed out previously that the herein described reactants do not have a phenolic hydroxyl but have an alcoholic hydroxyl. However, after the initial oxyalkylation step the phenolic hydroxyl then becomes an alcoholic hydroxyl. Thus, the similarity in oxyalkylation procedure.

*Example 1a*

The polymer employed was the commercially available previously described hydroxy polybutene i.e., poly (1-phenyl, 3-hydroxymethyl butene). The product was placed in a suitable vessel containing heating and cooling coils, an agitator, thermometer, sampling device, etc. The capacity of the vessel was approximately 3000 grams. Such equipment is conventional for oxyalkylation and has been described previously. The amount of polymer employed was 490 grams. The solvent employed was xylene and the amount added was an equal weight, to wit, 490 grams. Sufficient heat was applied so as to completely dissolve the resin in the xylene. The mass was allowed to cool and then there was added approximately 1% by weight of the resin or 4.9 grams of very finely divided sodium hydroxide. The mass was stirred and then flushed out with nitrogen. The mixture was then refluxed again, using a phase-separating trap so as to return the xylene to solution and eliminate either moisture present mechanically or formed by the reaction which involved the formation of an alcoholate and simultaneously a mole of water. After such dehydration period which required approximately two hours the mass was allowed to cool to approximately 125–130° C. and then purged with nitrogen so as to eliminate any air present. The autoclave was then sealed and oxyethylation was started at a temperature of about 125° C. In this particular example the temperature was maintained at approximately this point during the entire oxyalkylation procedure, which required only one hour. The amount of ethylene oxide employed was approximately the same weight as the initial sample, to wit 510 grams. The finished batch was diluted with more xylene so as to yield a 50% solution for convenience. The pressure range in this example and, as a matter of fact, in all subsequent examples was within the range of 10 to 75 p.s.i.

*Example 24a*

In this particular example the amount of oxide employed was approximately ten times as much on the basis of the polymer reacted as in Example 1a. The equipment used was identical except of somewhat larger capacity, to wit, about 5 gallons. The amount of solvent used and reactant used were identical with Example 1a, preceding, but the amount of finely powdered catalyst (sodium hydroxide) was ten times as much, to wit, 49 grams, so as to avoid the necessity of adding more catalyst during the oxyalkylation procedure. The ethylene oxide was added in the same way as noted in Example 1a. It is probable the initial addition of oxide takes place more rapidly due to the greater amount of catalyst present but the overall time to add all the ethylene oxide (5100 grams) was approximately 8 hours.

Depending on the equipment used and the effectiveness of the stirring apparatus one must sometimes use a somewhat higher temperature so as to overcome any difficulty caused by increased viscosity. Such variations in temperature are conventional and no further elaboration is required.

*Example 26a*

This example as far as reactants employed, procedure, etc., are concerned is the same with Example 24a with two differences; in the first place 5100 grams of propylene oxide were added instead of ethylene oxide. In this instance, after 10% of the propylene oxide was added (510 grams) the temperature was then dropped from 120–125° C. to 95–100° C., and the remainder of the oxypropylation covering the introduction of 90% of the propylene oxide was conducted at this reduced temperature. Due to the fact that propylene oxide is not quite as reactive as ethylene oxide, and also in light of the lower temperature, the time required was about 16 hours.

The products obtained when the xylene evaporates resemble sticky solids or viscous liquids and are generally straw colored or somewhat darker. In some instances, this discoloration was due to contact with air while still warm and in other instances due to the fact the solvent, instead of xylene, was a high-boiling aromatic solvent which gave some residual color. In some instances, the alkalinity was removed by passing $CO_2$ through the mixture or adding enough acetic acid to neutralize the basic material left. No particular effort was made to preserve color although this could be done, for the reason that most of the uses herein described elsewhere attach no significance to color as such for use as demulsifiers for water-in-oil emulsions, as emulsifiers in cutting oils, etc.

In many instances, the alkali was not neutralized and the product obtained was subjected to oxyalkylation with another oxide as, for example, an oxyethylated derivative was then subjected to reaction with propylene oxide or, inversely, an oxypropylated derivative was subjected to reaction with ethylene oxide. Indeed, it has been pointed out that the preferred products and particularly from the standpoint of demulsification and for many other uses involve employment of both propylene oxide and ethylene oxide. See attached drawing.

Furthermore, as pointed out in the claims, the preference in this particular sub-genus is the restricted class in which propylene oxide is added first and then ethylene oxide. If an oxypropylated derivative is subjected to oxyethylation the same procedure is employed as previously, although it is generally advantageous to add a total amount of catalyst such as caustic soda, sodium methylate or the like at the initial step so as not to require addition of more catalyst during the oxyethylation step. A general rule is that the amount of catalyst employed, whether a previously suggested catalyst or others such as caustic potash or even sodium methylate (calculated as sodium hydroxide) should be in the neighborhood of 1% to .1%, in the finished product. The amount of initial catalyst would depend on the degree of overall oxyalkylation so there would be sufficient catalyst during the final stage. Catalyst can be added before or between the initial and final steps but, generally speaking, this is an undesirable step purely from the standpoint of manipulation and other reasons which are well known.

The temperatures employed in oxyethylation invariably are in the range of 120–125° C. During oxypropylation, if it happened to be the second step, the temperature was then held at the oxyethylation temperature until approximately 10% of the propylene oxide was added so as to speed up initial reaction and then dropped to about 95–100° C. for the rest of the reaction. If, inversely, oxypropylation represented the first step, then and in that event, the first 10% of the propylene oxide is added at the higher temperature range previously designated, and then the remainder at the lower temperature range, to wit, 95–100° C. When the changeover is made from propylene to ethylene oxide, such as terminal oxyethylation, the addition of ethylene oxide is done at the uniform temperature of 100–105° C.

Briefly, the preferred oxyalkylation (the final 90% of propylene oxide and any terminal oxyethylation) is conducted at a temperature of 90–100° C., within viscosity limitations.

In the following table previous examples are repeated in abbreviated form together with a large number of other examples. Some of the examples show oxyethylation alone, oxypropylation alone, and others show the use of the two oxides in the order indicated. Reference to temperature is eliminated in light of what is said above but reference to the time period is included.

TABLE I

| Ex. Nos. | Grams of commercial polybutene* | Ethylene oxide, grams | Propylene oxide, grams | Oxide used first | Time required oxyethylation | Time required for oxypropylation | Corresponds to following numbers on attached drawing |
|---|---|---|---|---|---|---|---|
| 1a | 490 | 510 | | | 1 | | 1 |
| 2a | 530 | 470 | | | 1 | | 2 |
| 3a | 120 | 150 | 730 | PrO | 1 | 5 | 3 |
| 4a | 130 | 90 | 780 | PrO | 1 | 6 | 4 |
| 5a | 170 | 300 | 530 | PrO | 2 | 3 | 5 |
| 6a | 110 | 60 | 830 | PrO | ½ | 6 | 6 |
| 7a | 430 | 320 | 250 | PrO | 1 | 2 | 7 |
| 8a | 250 | 370 | 380 | EtO | 2 | 3 | 8 |
| 9a | 250 | 250 | 500 | PrO | 1 | 4 | 9 |
| 10a | 170 | 190 | 640 | PrO | 1½ | 4 | 10 |
| 11a | 630 | 370 | | | ½ | | 11 |
| 12a | 250 | | 750 | | | 4 | 12 |
| 13a | 170 | 330 | 500 | PrO | 2 | 3 | 13 |
| 14a | 20 | 255 | 725 | PrO | 8 | 36 | 14 |
| 15a | 15 | 435 | 550 | PrO | 16 | 36 | 15 |
| 16a | 40 | 60 | 900 | PrO | 2 | 24 | 16 |
| 17a | 35 | 215 | 750 | PrO | 8 | 18 | 17 |
| 18a | 30 | 110 | 860 | PrO | 3 | 36 | 18 |
| 19a | 25 | 220 | 755 | PrO | 8 | 40 | 19 |
| 20a | 25 | 330 | 645 | PrO | 10 | 30 | 20 |
| 21a | 25 | 55 | 920 | PrO | 2 | 42 | 21 |
| 22a | 36 | | 640 | | | 20 | 22 |
| 23a | 165 | | 835 | | | 8 | 23 |
| 24a | 490 | 5,100 | | | 8 | | 24 |
| 25a | 490 | | 510 | | | 3 | 25 |
| 26a | 490 | | 5,100 | | | 16 | 26 |

*Poly(1-phenyl, 3-hydroxymethyl butene).

Note: What has been said previously in regard to the temperatures used, and the amount of alkaline catalyst used (which in all these examples was finely divided caustic soda) applies to all examples in the above table. There was always present an amount of solvent at least equal in weight to the initial polymer. The final product was diluted for convenience to give a 50% solution. The solvent was xylene or a high-boiling aromatic solvent or a mixture. Xylene is advantageously used when it is desired to vacuum distill the product so as to remove the solvent.

Previous reference has been made to the amount of alkaline catalyst used, whether dispersed metallic sodium, caustic soda, sodium methoxide, caustic potash, etc. Caustic soda is satisfactory in all the herein described oxyalkylations. As has been noted previously, it is desirable to add all the required catalyst first, i.e., enough to carry through to the very end of the oxyalkylation. This is conventional procedure; for instance, see Table I of U.S. Patent No. 2,792,369, dated May 14, 1957, to Dickson. Note in the final stages the percentage of caustic soda present is, on a calculated basis, about 0.15%.

As has been previously noted, the pressures in all the compounds described in Table I, and for that matter in other subsequent tables come within the range of 10 to 75 pounds per square inch.

Reference is made to the hereto attached drawing which shows compounds derived by oxyethylation alone and compounds derived by oxypropylation alone, and also by a combination of the two oxides in any order or using one oxide first, then the second oxide, and then adding more of the initial oxide. However, our preference is to use either the oxyethylated product or the oxypropylated product, or the product derived by oxypropylation first followed by oxyethylation. Table II immediately following gives the compositional data in regard to the various lettered points on the attached drawing. The numbered points were recorded in Table I.

TABLE II

| Ex. No. | Lettered points on drawing | Percent by weight of initial polymer | Percent by weight of propylene oxide | Percent by weight of ethylene oxide |
|---|---|---|---|---|
| 1b | C | 1 | 99 | |
| 2b | D | 47 | | 53 |
| 3b | E | 65 | | 35 |
| 4b | F | 65 | 35 | |
| 5b | G | 30 | 70 | |
| 6b | H | 1 | 46 | 53 |
| 7b | J | 1 | 64 | 35 |
| 8b | K | 30 | 35 | 35 |
| 9b | L | 1 | 97 | 2 |
| 10b | M | 30 | 68 | 2 |

The manufacturing procedure employed was identical, of course, with that described in regard to the examples in Table I.

Previous reference has been made to the use of butylene oxide alone or in combination with either propylene oxide or ethylene oxide or, for that matter, in combination with both propylene and ethylene oxide. It is not believed anything more need be said in regard to the use of butylene oxide in light of available data. For instance, note U.S. Patent 2,819,214, dated January 7, 1958, to De Groote et al. This is concerned with the oxyalkylation of tetramethylolcyclohexanol by use of butylene oxide and ethylene oxide in combination starting with either one of the oxides first. Oxybutylation can be conducted in the same manner as described in this patent with specific reference to Part 2, Section A. Our preference in regard to the use of butylene oxide is to use it as the initial stage, followed by oxyethylation or oxypropylation and oxyethylation. The amount preferably employed for such initial stage oxybutylation would be in the order of equal weight or possibly twice the weight of the initial polyol reactant. In such initial oxyalkylation employing butylene oxide, our preference again is to use a fairly high temperature to start, for instance, 120–125° C., and then drop to approximately 95–100° C. as previously noted. Catalyst, temperature, time periods, etc., are about the same as previously.

As specific examples showing the use of butylene oxide alone and particularly in combination with ethylene oxide or both ethylene oxide and propylene oxide, reference is made to Table III following.

It is to be noted that a drawing depicting oxybutylation alone (and incidentally oxyethylation) and a combination of the two can be presented in the form of a variant of the hereto attached drawing. Note, for instance, the drawing in aforementioned U.S. Patent 2,819,214. Similarly, if one attempts to present the four-component composition (the three oxides and a polyol)

in graphic form one must employ a different type of presentation as, for example, the drawing attached to U.S. Patent No. 2,819,219, dated January 7, 1958, to De Groote et al.

TABLE III

| Ex. No. | Percent by weight of initial polymer | Percent by weight of butylene oxide | Percent by weight of propylene oxide | Percent by weight of ethylene oxide |
| --- | --- | --- | --- | --- |
| 1c | 65.8 | 34.2 | | |
| 2c | 49.0 | 51.0 | | |
| 3c | 39.4 | 40.2 | | 20.4 |
| 4c | 32.9 | 34.2 | | 32.9 |
| 5c | 28.2 | 29.4 | | 42.4 |
| 6c | 24.8 | 25.6 | | 49.6 |
| 7c | 16.6 | 17.0 | | 66.4 |
| 8c | 12.5 | 13.0 | | 74.5 |
| 9c | 9.9 | 10.3 | | 79.8 |
| 10c | 2 | 2.08 | 70.42 | 25.5 |
| 11c | 1.5 | 1.56 | 53.44 | 43.5 |
| 12c | 4 | 4.16 | 85.84 | 6.0 |
| 13c | 3.5 | 3.64 | 71.36 | 21.5 |
| 14c | 3.0 | 3.12 | 88.38 | 5.5 |
| 15c | 3.0 | 3.12 | 82.88 | 11.0 |
| 16c | 2.5 | 2.6 | 72.90 | 22.0 |
| 17c | 2.5 | 2.6 | 61.90 | 33 |
| 18c | 2.5 | 2.6 | 89.40 | 5.5 |
| 19c | 2.0 | 2.08 | 73.92 | 22.0 |
| 20c | 5.5 | 5.72 | 60.38 | 28.4 |
| 21c | 7.75 | 8.05 | 72.20 | 12.0 |
| 22c | 8.25 | 8.57 | 56.46 | 26.72 |
| 23c | 9.00 | 9.35 | 43.45 | 38.20 |
| 24c | 1.5 | 1.56 | 78.25 | 18.63 |

Previous reference has been made to the use of glycide and for that matter methylglycide. Glycide (glycidol) is available from at least one source. Apparently, methylglycide is not available commercially at this time and must be prepared. Reference will be made exclusively to the use of glycide although methylglycide, if available, would be used in the same way. The advantage of the use of glycide is an increased branching effect. For instance, glycide can be reacted in the same manner as the other oxides employed, using for example one mole of glycide to the initial polymer, or two moles of glycide to the initial polymer. If the initial polymer has five hydroxyls, the first procedure would increase it to 6, and the second procedure would increase it to 7 hydroxyls. Similarly, if one oxypropylates first and then adds some ethylene oxide, it is sometimes advantageous towards the final stage of oxyethylation to add one mole of glycide for each initial hydroxyl, for instance, 3, 4, 5, 6 or 7 moles as the case may be, and then proceed with further oxyethylation. The probable result is increased branching which is of value in some instances. It is also to be noted that reaction with one or two moles of glycide with the original polyol yields a product that is particularly suitable for the manufacture of paints, coatings, and the like.

We have prepared derivatives by the obviously simple expedient of reacting a mole of the commercial polyol having a molecular weight of approximately 1150 with either one mole of glycide or two moles of glycide using an alkaline catalyst of the kind previously described. In the first instance, the addition product had a molecular weight of approximately 1225 and in the second case of approximately 1300. We have simply replaced the initial polyol in many of the preceding examples and particularly those in which propylene oxide is used first and then ethylene oxide with these two addition products and retained the same molecular proportion. In a general way, the weight proportion is approximately the same due to the slight difference as noted, 1150 vs. 1300.

However, if the polyol which has been treated with one, two, three or four moles of glycide and preferably two moles of glycide, is reacted with only one oxide and particularly with propylene oxide or ethylene oxide, such products yield compounds of unusual interest and in a general way fall into the same composition range as has been indicated in regard to propylene oxide without the preliminary use of glycide or ethylene oxide without such initial use of glycide.

In many instances excellent products are obtained by simply adding on the average one mole of the alkylene oxide per hydroxyl radical. Needless to say, this is not intended to indicate that each mole of ethylene oxide reacts with one hydroxyl but is used simply as a yardstick of measurement. In some instances products are obtained as noted elsewhere, which have less than one mole, for instance as little as one or two moles of glycide per polymer molecule. In the previous tables the illustrations have been limited to our preferred form, to wit, where the amount of oxide introduced is at least two moles per hydroxyl but, as previously indicated, it might well all be attached to the terminal hydroxyl groups. Obviously, examples of the kind which appear in some of the previous tables could be repeated using one mole of oxide per hydroxyl and, for the matter, it might not necessarily be the same epoxide. For example, one might add to a polymer having five hydroxyls two moles of glycide and three moles of ethylene oxide; or two moles of propylene oxide, or butylene oxide, and two or three moles of glycide or possibly two of glycide and one of ethylene oxide.

PART 4

As to the use of conventional demulsifying agents reference is made to U.S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Examples No. 15 and No. 18 herein described.

Having thus described our invention, what we claim as new and desire to obtain by Letters Patent is

1. A process for breaking petroleum emulsions of the water-in-oil type characterized by subjecting the emulsion to the action of a demulsifier including hydrophile synthetic products, said hydrophile synthetic products being the oxyalkylation product of (a) an alpha-beta alkylene oxide having not more than 4 carbon atoms and selected from the class consisting of ethylene oxide, propylene oxide, butylene oxide, glycide and methyl glycide and (b) an oxyalkylation-susceptible, fusible, organic solvent-soluble, water-insoluble poly(1-phenyl, 3-hydroxymethyl butene); said oxyalkylated derivative being characterized by the introduction into the polymer molecule of a plurality of divalent radicals having the formula $(R_1O)_n$ in which $R_1$ is a member selected from the class consisting of ethylene radicals, propylene radicals, butylene radicals, hydroxy propylene radicals, and hydroxy butylene radicals, and $n$ is a numeral varying from 10 to 200; with the proviso that at least one mole of alkylene oxide be introduced for each hydroxyl radical in the initial polymeric reactant.

2. A process for breaking petroleum emulsions of the water-in-oil type characterized by subjecting the emulsion to the action of a demulsifier including hydrophile synthetic products, said hydrophile synthetic products being the oxyalkylation product of (a) an alpha-beta alkylene oxide having not more than 4 carbon atoms and selected from the class consisting of ethylene oxide, propylene oxide, butylene oxide, glycide and methyl glycide and (b) an oxyalkylation-susceptible, fusible, organic solvent-soluble, water-insoluble poly(1-phenyl, 3-hydroxymethyl butene); said oxyalkylated derivative being characterized by the introduction into the polymer molecule of a plurality of divalent radicals having the formula $(R_1O)_n$ in which $R_1$ is a member selected from the class consisting of ethylene radicals, propylene radicals, butylene radicals, hydroxy propylene radicals, and hydroxy butylene radicals, and $n$ is a numeral varying from 10 to 200; with the proviso that at least one mole of alkylene oxide be introduced for each hydroxyl radical in the initial polymer reactant with the added proviso that the non-terminal structural units correspond to the formula

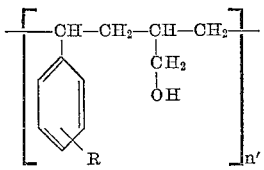

in which R is a hydrocarbon radical having not over 10 carbon atoms, and $n'$ is a whole number from 3 to 10.

3. A process for breaking petroleum emulsions of the water-in-oil type characterized by subjecting the emulsion to the action of the demulsifier including hydrophile synthetic products, said hydrophile synthetic products being the oxyalkylation product of (a) an alpha-beta alkylene oxide having not more than 4 carbon atoms and selected from the class consisting of ethylene oxide, propylene oxide, butylene oxide, glycide and methyl glycide and (b) an oxyalkylation-susceptible, fusible, organic solvent-soluble, water-insoluble poly(1-phenyl, 3-hydroxymethyl butene); said oxyalkylated derivative being characterized by the introduction into the polymer molecule of a plurality of divalent radicals having the formula $(R_1O)_n$ in which $R_1$ is a member selected from the class consisting of ethylene radicals, propylene radicals, butylene radicals, hydroxy propylene radicals, and hydroxy butylene radicals, and $n$ is a numeral varying from 10 to 200; with the proviso that at least one mole of alkylene oxide be introduced for each hydroxyl radical in the initial polymer reactant, with the added proviso that the non-terminal structural units correspond to the formula

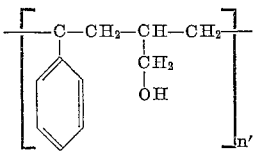

in which $n'$ is a whole number from 3 to 10.

4. A process for breaking petroleum emulsions of the water-in-oil type characterized by subjecting the emulsion to the action of a demulsifier including hydrophile synthetic products, said hydrophile synthetic products being the oxyalkylation product of (a) an alpha-beta alkylene oxide having not more than 4 carbon atoms and selected from the class consisting of ethylene oxide, propylene oxide, butylene oxide, glycide and methyl glycide and (b) an oxyalkylation-susceptible, fusible, organic solvent-soluble, water-insoluble poly(1-phenyl, 3-hydroxymethyl butene); said oxyalkylated derivative being characterized by the introduction into the polymer molecule of a plurality of divalent radicals having the formula $(R_1O)_n$ in which $R_1$ is a member selected from the class consisting of ethylene radicals, propylene radicals, butylene radicals, hydroxy propylene radicals and hydroxy butylene radicals, and $n$ is a numeral varying from 10 to 200; with the proviso that at least one mole of alkylene oxide be introduced for each hydroxyl radical in the initial polymeric reactant, with the added proviso that the non-terminal structural units correspond to the formula

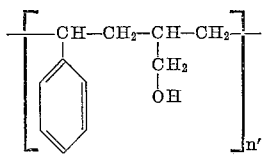

in which $n'$ is a whole number from 3 to 10; with the further proviso that the molecular weight of the initial polymeric reactant be within the range of 750 to 2250.

5. A process for breaking petroleum emulsions of the water-in-oil type characterized by subjecting the emulsion to the action of a demulsifier including hydrophile synthetic products, said hydrophile synthetic products being the oxyalkylation product of (a) and alpha-beta alkylene oxide having not more than 4 carbon atoms and selected from the class consisting of ethylene oxide, propylene oxide, butylene oxide, glycide and methyl glycide and (b) an oxyalkylation-susceptible, fusible, organic solvent-soluble, water-insoluble poly(1-phenyl, 3-hydroxymethyl butene); said oxyalkylated derivative being characterized by the introduction into the polymer molecule of a plurality of divalent radicals having the formula $(R_1O)_n$ in which $R_1$ is a member selected from the class consisting of ethylene radicals, propylene radicals, butylene radicals, hydroxy propylene radicals, and hydroxy butylene radicals, and $n$ is a numeral varying from 10 to 200; with the proviso that at least two moles of alkylene oxide be introduced for each hydroxyl radical in the initial polymeric reactant with the added proviso that the non-terminal structural units correspond to the formula

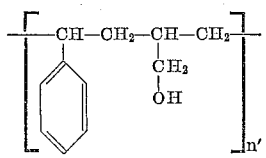

in which $n'$ is a whole number from 3 to 10; with the further proviso that the molecular weight of the initial polymeric reactant be within the range of 1000 to 1500.

6. A process for breaking petroleum emulsions of the water-in-oil type characterized by subjecting the emulsion to the action of a demulsifier including hydrophile synthetic products, said hydrophile synthetic products being the oxyalkylation product of (a) an alpha-beta alkylene oxide having not more than 4 carbon atoms and selected from the class consisting of ethylene oxide, propylene oxide, butylene oxide, glycide and methyl glycide and ($b_7$ and oxyalkylation-susceptible, fusible, organic solvent-soluble, water-insoluble poly(1-phenyl, 3-hydroxymethyl butene); said oxyalkylated derivative being characterized by the introduction into the polymer molecule of a plurality of divalent radicals having the formula $(R_1O)_n$ in which $R_1$ is a member selected from the class consisting of ethylene radicals, propylene radicals, butylene radicals, hydroxy propylene radicals, and hydroxy butylene radicals, and $n$ is a numeral varying from 10 to 200; with the proviso that at least two moles of alkylene oxide be introduced for each hydroxyl radical in the initial polymeric reactant, with the added proviso that the non-terminal structural units correspond to the formula

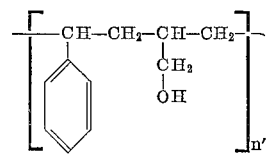

in which $n'$ is a whole number from 3 to 10; with the further proviso that the molecular weight of the initial polymeric reactant be within the range of 1000 to 1500, and with the final proviso that the hydrophile properties of said oxyalkylated resin in an equal weight of xylene are sufficient to produce an emulsion when said xylene solution is shaken vigorously with one to three volumes of water.

7. A process for breaking petroleum emulsions of the water-in-oil type characterized by subjecting the emulsion to the action of a demulsifier including hydrophile synthetic products, said hydrophile synthetic products being the oxyalkylation product of (a) an alpha-beta alkylene oxide having not more than 4 carbon atoms and selected from the class consisting of ethylene oxide, propylene oxide, butylene oxide, glycide and methyl glycide and (b) an oxyalkylation-susceptible, fusible, organic solvent-soluble, water-insoluble poly(1-phenyl, 3-hydroxymethyl butene); said oxyalkylated derivative being characterized by the introduction into the polymer molecule of a plurality of divalent radicals having the formula $(R_1O)_n$ in which $R_1$ is a member selected from the class consisting of ethylene radicals, propylene radicals, butylene radicals, hydroxy propylene radicals, and hydroxy butylene radicals, and $n$ is a numeral varying from 10 to 200; with the proviso that at least two moles of alkylene oxide be introduced for each hydroxyl radical in the initial polymeric reactant, with the added proviso that the non-terminal structural units correspond to the formula

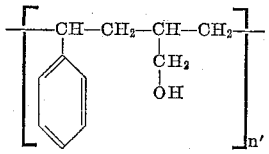

in which $n'$ is a whole number from 3 to 10; with the further proviso that the molecular weight of the initial polymeric reactant be within the range of 1000 to 1500, and with the further proviso that the hydrophile properties of said oxyalkylated resin in an equal weight of xylene are sufficient to produce an emulsion when said xylene solution is shaken vigorously with one to three volumes of water, and with the final proviso that the composition on a weight basis of the oxyalkylated polymer be within the pentagonal area DEFCH of the attached drawing.

8. A process for breaking petroleum emulsions of the water-in-oil type characterized by subjecting the emulsion to the action of a demulsifier including hydrophile synthetic products, said hydrophile synthetic products being the oxyalkylation product of (a) an alpha-beta alkylene oxide having not more than 4 carbon atoms and selected from the class consisting of ethylene oxide, propylene oxide, butylene oxide, glycide and methyl glycide and (b) an oxyalkylation-susceptible, fusible, organic solvent-soluble, water-insoluble poly(1-phenyl, 3-hydroxymethyl butene); said oxyalkylated derivative being characterized by the introduction into the polymer molecule of a plurality of divalent radicals having the formula $(R_1O)_n$ in which $R_1$ is a member selected from the class consisting of ethylene radicals, propylene radicals, butylene radicals, hydroxy propylene radicals, and hydroxy butylene radicals, and $n$ is a numeral varying from 10 to 200; with the proviso that at least two moles of alkylene oxide be introduced for each hydroxyl radical in the initial polymeric reactant, with the added proviso that the non-terminal structural units correspond to the formula

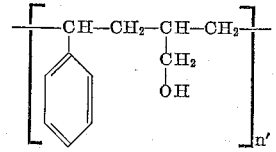

in which $n'$ is a whole number from 3 to 10; with the further proviso that the molecular weight of the initial polymeric reactant be within the range of 1000 to 1500, and with the further proviso that the hydrophile properties of said oxyalkylated resin in an equal weight of xylene are sufficient to produce an emulsion when said xylene solution is shaken vigorously with one to three volumes of water, and with the final proviso that the oxyalkylated polymer be derived solely from propylene oxide and ethylene oxide and be within the parallelogram KMLJ of the attached drawing.

9. The process of claim 8 with the proviso that the oxyalkylated polymer be derived solely from propylene oxide and ethylene oxide and be within the parallelogram K,M,L,J of the attached drawing, and with the further proviso that all the propylene oxide be added first and then the ethylene oxide.

10. The process of claim 8 with the proviso that the oxyalkylated polymer be derived solely from propylene oxide and ethylene oxide and be within the triangle JML of the attached drawing, and with the further proviso that all the propylene oxide be added first and then the ethylene oxide.

References Cited in the file of this patent
UNITED STATES PATENTS

| | | |
|---|---|---|
| 2,454,541 | Bock et al. | Nov. 23, 1948 |
| 2,454,545 | Bock et al. | Nov. 23, 1948 |
| 2,499,365 | De Groote et al. | Mar. 7, 1950 |
| 2,558,688 | Landa | June 26, 1951 |
| 2,754,271 | Kirkpatrick | July 10, 1956 |
| 2,774,741 | Martinelli | Dec. 18, 1956 |
| 2,806,844 | Gerecht et al. | Sept. 17, 1957 |